(12) United States Patent
Kim

(10) Patent No.: US 9,492,030 B2
(45) Date of Patent: Nov. 15, 2016

(54) COOKING PAN PROVIDED WITH EXHAUST DEVICE

(75) Inventor: Jong Hyun Kim, Busan (KR)

(73) Assignee: PELLYTECH CO., LTD., Busan (KR)

( * ) Notice: Subject to any disclaimer, the term of this patent is extended or adjusted under 35 U.S.C. 154(b) by 0 days.

(21) Appl. No.: 13/320,499

(22) PCT Filed: May 15, 2009

(86) PCT No.: PCT/KR2009/002594
§ 371 (c)(1),
(2), (4) Date: Nov. 14, 2011

(87) PCT Pub. No.: WO2010/131791
PCT Pub. Date: Nov. 18, 2010

(65) Prior Publication Data
US 2012/0055347 A1    Mar. 8, 2012

(51) Int. Cl.
*A47J 36/38*    (2006.01)
*A47J 37/10*    (2006.01)

(52) U.S. Cl.
CPC .............. *A47J 36/38* (2013.01); *A47J 37/10* (2013.01); *A47J 37/108* (2013.01)

(58) Field of Classification Search
CPC ........ A47J 37/10; A47J 37/0694; A21B 3/15
USPC .................. 99/422, 425, 426, 447
See application file for complete search history.

(56) References Cited

U.S. PATENT DOCUMENTS

| | | | | |
|---|---|---|---|---|
| 3,217,634 A | * | 11/1965 | Fox | 99/339 |
| 3,301,172 A | * | 1/1967 | Longo | 99/446 |
| 3,500,813 A | * | 3/1970 | Opdahl | 126/39 R |
| 3,604,334 A | * | 9/1971 | Ballentine | 99/483 |
| 3,688,758 A | * | 9/1972 | Stephen et al. | 126/41 R |
| 4,195,560 A | * | 4/1980 | DuBois et al. | 99/422 |
| 4,353,347 A | * | 10/1982 | Seed | 126/41 R |
| 4,382,432 A | * | 5/1983 | Lizdas | 126/25 A |
| RE32,133 E | * | 5/1986 | Koziol | 126/39 E |
| 4,942,903 A | * | 7/1990 | Jacobsen | 138/110 |
| 5,382,005 A | * | 1/1995 | Weiss | 266/257 |
| 5,620,623 A | * | 4/1997 | Baker | 219/400 |
| 5,967,135 A | * | 10/1999 | Shariat | 126/275 R |
| 6,051,266 A | * | 4/2000 | Totsuka | 426/466 |

(Continued)

FOREIGN PATENT DOCUMENTS

| | | |
|---|---|---|
| JP | 2002-142968 A | 5/2002 |
| KR | 20-1999-0041258 U | 12/1999 |

(Continued)

*Primary Examiner* — David Angwin
*Assistant Examiner* — Jimmy Chou
(74) *Attorney, Agent, or Firm* — Birch, Stewart, Kolasch & Birch, LLP

(57) ABSTRACT

A cooking pan provided with an exhaust device is capable of reducing smells or smoke generated when food is cooked. The cooking pan includes a distribution plate that is installed at the center of a lower surface of a bottom part of the cooking pan with a predetermined gap to form an exhaust space part, and an exhaust pipe that connects the exhaust space part with an interior of the cooking pan. Thus, the smells and smoke of the interior of the cooking pan are forcibly discharged and burnt by a pressure difference between the interior and exterior of the cooking pan and by flowing flames applied to the distribution plate of the lower surface of the cooking pan, so that the unpleasant smells and smoke are remarkably reduced, as is the emission of carbon dioxide.

13 Claims, 6 Drawing Sheets

(56) References Cited

U.S. PATENT DOCUMENTS

| | | | | |
|---|---|---|---|---|
| 6,065,466 | A * | 5/2000 | Baykal | 126/41 R |
| 6,105,487 | A * | 8/2000 | Nash et al. | 99/400 |
| 6,125,738 | A * | 10/2000 | Poister | 99/339 |
| 6,942,887 | B1 * | 9/2005 | Freedman | 426/466 |
| 7,044,050 | B1 * | 5/2006 | Cook | 99/482 |
| 7,838,799 | B2 * | 11/2010 | Freedman | 219/385 |
| 2005/0039612 | A1 * | 2/2005 | Denny | 99/450 |
| 2009/0114624 | A1 * | 5/2009 | Ogoshi | 219/86.25 |

FOREIGN PATENT DOCUMENTS

| | | | |
|---|---|---|---|
| KR | 20-0422882 Y1 | 8/2006 | |
| KR | 10-2007-0019526 A | 2/2007 | |
| WO | WO 2006118225 A1 * | 11/2006 | B23K 37/02 |

* cited by examiner

COOKING PAN PROVIDED WITH EXHAUST DEVICE

TECHNICAL FIELD

The present invention relates to technology for effectively reducing by-products such as smell, smoke and carbon dioxide generated when cooking is done using a gas stove.

BACKGROUND ART

Usually when cooking is done using a gas stove, smell or smoke is inevitably generated, and typically causes inconvenience and unpleasantness because it forces a user to drive a ventilating fan or to open windows to provide fresh air after the cooking is done.

In most households, cooking is frequently done in a closed room. For this reason, when the cooking takes place over a long time, the foregoing problem becomes more serious. Accordingly, there is a high need to overcome this problem.

As the related art for overcoming this problem, there is a cooking pan that is provided with a hole in a lower portion thereof which is connected with the interior thereof. According to the technical instructions regarding this cooking pan, when the cooking pan is heated by a gas stove with its lid closed, heat collects in the interior of the cooking pan due to rising of the flames, and thus the interior of the cooking pan is heated to high temperature, so that smell and smoke generated from food can be reduced. This related art has an effect on reducing the smell and smoke to some extent. This effect is slight because the temperature of the interior of the cooking pan does not rise beyond a fixed temperature.

DISCLOSURE

Technical Problem

Accordingly, the present invention has been made keeping in mind the above problems occurring in the related art, and is intended to provide a cooking pan provided with an exhaust device, which allows smells or smoke generated when used to be effectively reduced using the fact that flames and heat rise.

Technical Solution

In one aspect, the present invention provides a cooking pan provided with an exhaust device, which comprising: a distribution plate that is installed at the center of a lower surface of a bottom part of the cooking pan with a predetermined gap to form an exhaust space part; and an exhaust pipe that connects the exhaust space part with an interior of the cooking pan.

The exhaust pipe may be installed on an upper surface of the bottom part so as to be connected with an exhaust hole in the center of the bottom part.

The exhaust pipe may be formed along an outer surface of the cooking pan, and be configured so that an upper end thereof is connected with a lateral exhaust hole formed in one side of the cooking pan, and a lower end thereof leads to the exhaust space part.

The distribution plate may include an exhaust distributor protruding from the center of an upper surface thereof in a conical shape, and a flame distributor formed on a lower surface thereof in a dome shape.

The distribution plate may be formed of ceramic.

The distribution plate may be coupled to the bottom part of the cooking pan so as to form the exhaust space part using a plurality of protrusion nuts formed on the bottom part of the cooking pan and bolts.

The exhaust pipe may include a discharge hole in a lower surface thereof inserted into the exhaust space part, and the discharge hole may be open so as to have the same center as the center of the upper surface of the distribution plate.

The distribution plate may be selectively attached to and detached from a plurality of couplers formed on the lower surface of the bottom part of the cooking pan.

Each coupler may include a cut coupling slit, and the distribution plate may include hooks at an edge thereof which are fitted into the coupling slits. The edge of the distribution plate may include notches so as to separate the hooks from each other and come in the same number as there are couplers, and each hook may include a protruding stopper that restricts a maximum rotational angle of the distribution plate.

The lower surface of the bottom part of the cooking pan may have a plurality of support protrusions that protrude inside the corresponding couplers, and each support protrusion has the same height as the coupling slit so as to easily fasten the distribution plate.

The distribution plate may be constrained to a closable coupler that is coupled to the bottom part of the cooking pan so as to communicate with the exhaust pipe and includes a plurality of outflow holes formed in an outer circumferential surface thereof, and may move up and down along the closable coupler.

The closable coupler may include the plurality of outflow holes formed in the outer circumferential surface thereof, a protruding flange at a lower end thereof, and a slide member that is coupled with the distribution plate at a lower end thereof and includes a constraint end suspended on the flange at an upper end thereof, so as to allow the distribution plate to move up and down.

In another aspect, the present invention provides a cooking pan provided with an exhaust device which is turned upside down so as to allow cooking to be done. The cooking pan comprises: distribution plates, each of which is installed at the center of a lower surface of a bottom part of each of upper and lower cooking pans with a predetermined gap to form an exhaust space part; exhaust pipes, each of which connects the exhaust space part with an interior of the cooking pan; and closable couplers, each of which is coupled so that the distribution plate moves up and down, is coupled to the bottom part of each of the upper and lower cooking pans so as to communicate with the exhaust pipe, and includes a plurality of outflow holes formed in an outer circumferential surface thereof.

The closable couplers may each include the plurality of outflow holes formed in the outer circumferential surface thereof, a protruding flange at a lower end thereof, and a slide member that is coupled with the distribution plate at a lower end thereof and includes a constraint end suspended on the flange at an upper end thereof, so as to allow the distribution plate to move up and down.

The exhaust pipe may include a detachable washing pipe.

Advantageous Effects

As described above, the cooking pan having the exhaust device forcibly discharges smells or smoke generated in the interior thereof when food is cooked, and burns the smells or smoke with the flames, so that it contributes to remarkably reducing the smells or smoke and simultaneously reducing the emission of carbon dioxide, and thus can be helpful for the earth's environment.

Figure 1:
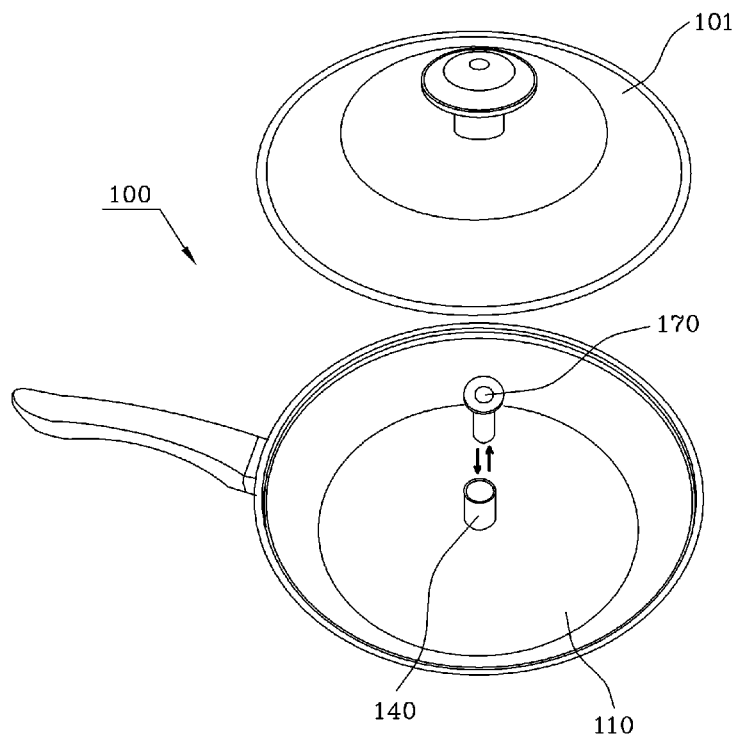
FIG. 1 is a perspective view showing a cooking pan according to a first embodiment of the present invention.

<Description of the reference numerals used in the drawings>

| | |
|---|---|
| 100: cooking pan | 100a: upper cooking pan |
| 100b: lower cooking pan | 110: bottom part |
| 111: exhaust hole | 112: protrusion nut |
| 114: support leg | 120: distribution plate |
| 121: exhaust distributor | 122: flame distributor |
| 123: hook | 124: notch |
| 125: stopper | 126: support protrusion |
| 130: exhaust space part | 113: lateral exhaust hole |
| 140: exhaust pipe | 141: discharge hole |
| 150: coupler | 150a: closable coupler |
| 151: coupling slit | 152: outflow hole |
| 153: flange | 160: slide member |
| 161: constraint end | 170: washing pipe |
| 101: lid | |

MODE FOR INVENTION

Hereinafter, exemplary embodiments of the present invention will be described in detail with reference to the accompanying drawings to facilitate understanding the present invention. While the exemplary embodiments of the present invention are shown in the accompanying drawings, it should be understood that modifications based on simple structural variation or substitution by equivalent elements may also be included within the spirit and scope of the invention.

A cooking pan of the present invention is configured to be able to effectively reduce the smells or smoke that is inevitably generated by cooking. The cooking pan is based on the principle of drawing air from the interior of the cooking pan via an exhaust pipe to thereby burn smoke or smells using the high-temperature flames that are heating the cooking pan.

In detail, in the cooking pan in which food is cooked with the lid closed, its interior is subjected to an increase in internal pressure due to heat expansion caused by gas flames, while its lower portion is subjected to a decrease in pressure because flames and heat rise. As such, the air of the interior of the cooking pan is naturally suctioned out through the exhaust pipe connected to the center of an outer bottom part of the cooking pan, so that the smells and smoke generated in the interior of the cooking pan are discharged. Since the gas flames have a high temperature of about 1000° C. to 1400° C., a considerable portion of the discharged smoke and smell can be burnt.

Figure 2:
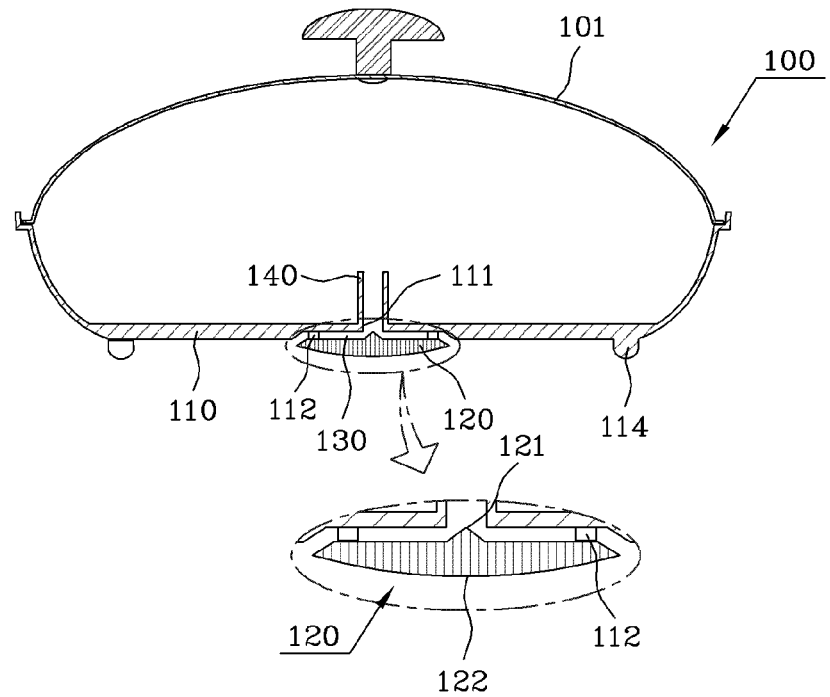
FIG. 2 is a cross-sectional view of the cooking pan.
Figure 3:
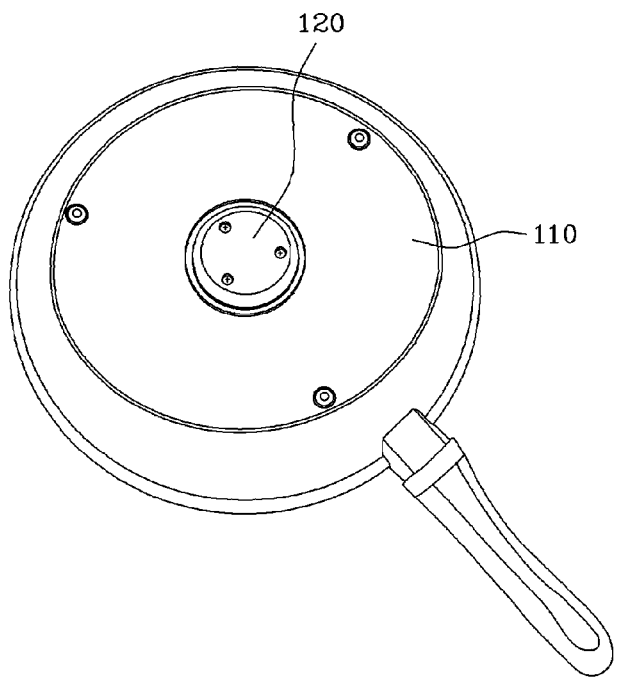
FIG. 3 is a perspective view showing a bottom part of the cooking pan.
Figure 4:
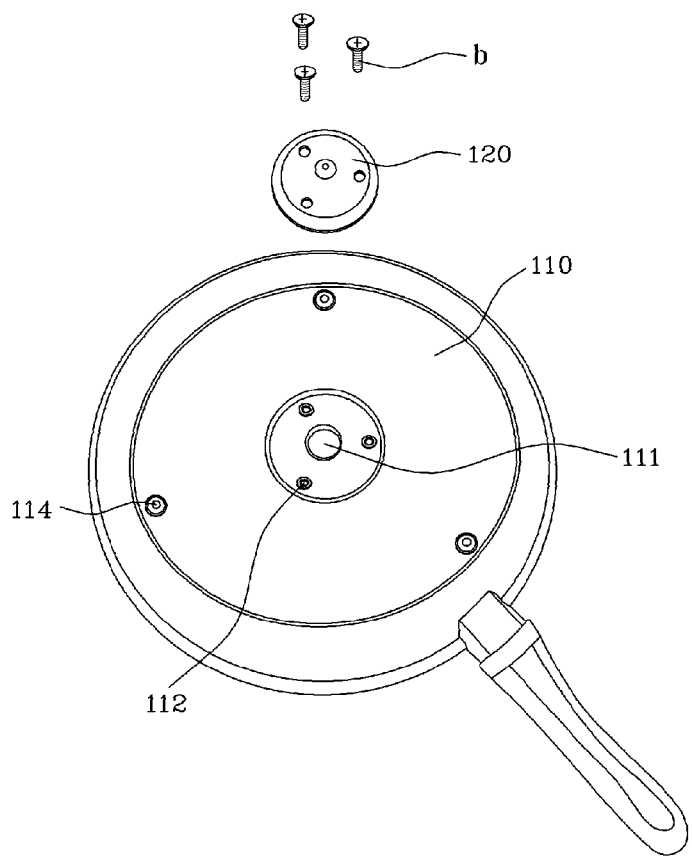
FIG. 4 is a perspective view showing an assembled distribution plate.

First, the cooking pan according to a first exemplary embodiment of the present invention will be described. FIG. 1 is a perspective view of the cooking pan. FIG. 2 is a cross-sectional view of the cooking pan. FIG. 3 is a perspective view showing a bottom part of the cooking pan. FIG. 4 is a perspective view showing an assembled distribution plate.

As shown in the drawings, the inventive cooking pan 100 having an exhaust device generally includes a lid 101, and is heated with the lid 101 which is closed during cooking. Particularly, the cooking pan in the present invention is suitable when a lower surface of the cooking pan is generally heated using cookware such as a gas stove.

The bottom part 110 of the cooking pan 100 is provided with a distribution plate 120 spaced apart from the center of a lower surface thereof. The distribution plate 120 is coupled to the lower surface of the bottom part 110 of the cooking pan. Thereby, an exhaust space part 130 is formed.

An exhaust pipe 140 is formed to connect the exhaust space part 130 with the interior of the cooking pan 100. In the case of the present embodiment, as shown, the exhaust pipe protrudes from an upper surface of the bottom part so as to be connected to an exhaust hole 111 formed in the center of the bottom part 110. In the case of the present embodiment, the exhaust pipe 140 is formed in the interior of the cooking pan 100 so that the lower surface of the bottom part can be connected to the upper surface of the bottom part in the interior of the cooking pan.

The distribution plate 120 is coupled to the center of the lower surface of the bottom part 110 of the cooking pan 100 with a predetermined gap, so that the exhaust space part 130 is provided. In the present embodiment, to couple the distribution plate 120 to the lower surface of the bottom part 110 of the cooking pan 100 to thereby form the exhaust space part 130, a plurality of protrusion nuts 112 protrude from the lower surface of the bottom part 110. As shown in FIG. 2 or 4, the exhaust hole 111 is bored in the center of the bottom part 110 so as to be connected with the exhaust pipe 140, and three protrusion nuts 112 protrude around the exhaust hole 111. Here, each protrusion nut 112 means that it is provided with female threads and is coupled with a bolt b. The distribution plate 120 is installed on the lower surface of the bottom part of the cooking pan by fastening the bolts b to the protrusion nuts 112. Since the protrusion nuts 112 protrude, the exhaust space part 130 may be formed by the coupling of the distribution plate 120.

Meanwhile, the distribution plate 120 is preferably provided with an exhaust distributor 121 protruding from the center of an upper surface thereof in a conical shape. The distribution plate 120 is provided with a flame distributor 122 on a lower surface thereof in a dome shape. The center of the exhaust distributor 121 protruding from the upper surface of the distribution plate 120 is located at the same position as is the exhaust hole 110, in the center. The exhaust distributor 121 is designed so that the smell or smoke from the interior of the cooking pan, which is discharged through the exhaust pipe 140 and the exhaust hole 111, can be uniformly diffused to the exhaust space part 130.

The flame distributor 122 formed on the lower surface of the distribution plate 120 in the dome shape is configured so that the flame reaching the distribution plate 120 can generate a flow distributed in an outward, upward direction. In detail, due to the flame distributor 122, the flame is allowed to flow rapidly in an outward direction, so that a smooth flow of the flame and a great pressure difference are formed to allow the smoke and smell generated in the interior of the cooking pan to be suctioned in a smoother way.

In this way, due to the presence of the distribution plate 120, the flame generated from the gas stove reaches the distribution plate 120 and then shows a tendency to be distributed outwards and upwards. For this reason, a flow of air is generated from the exhaust pipe 140 of the interior of the cooking pan toward the exhaust space part 130, so that the smell and smoke in the interior of the cooking pan is burnt by the flame of the gas stove.

Meanwhile, the distribution plate 120 may be formed of metal or nonmetal, and preferably ceramic, so as to be able to increase heat resistance and impact resistance. Particularly, the distribution plate formed of ceramic has good heat isolation, so that it can reduce heat expansion of the lower portion and radiate far-infrared rays.

Figure 5:
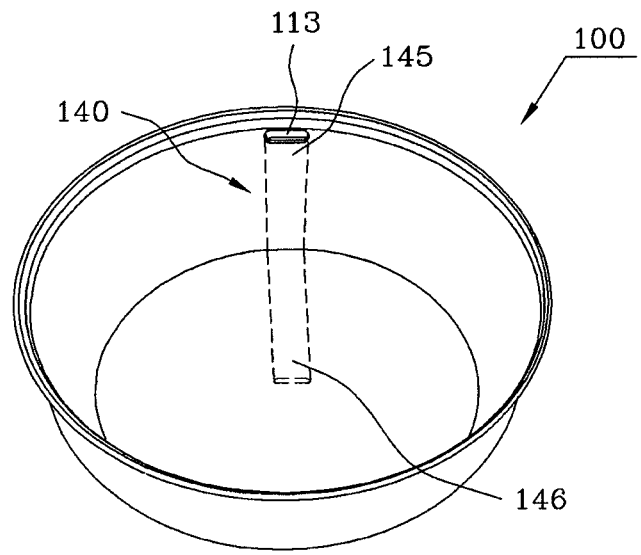
FIG. 5 is a top perspective view showing the top side of a cooking pan according to a second embodiment of the present invention.
Figure 6:
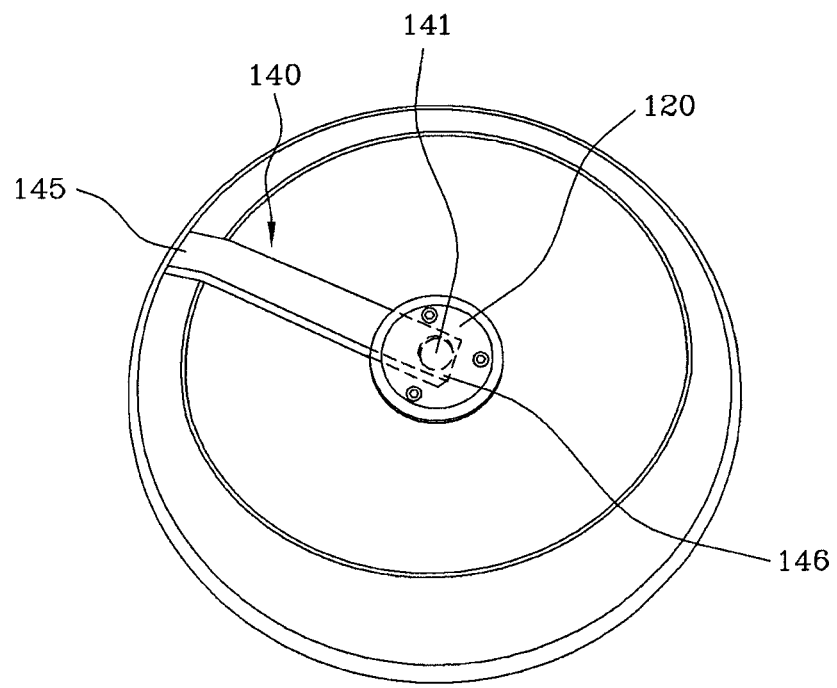
FIG. 6 is a perspective view shown from a lower side of the cooking pan.

Next, the cooking pan according to a second embodiment of the present invention will be described. FIG. 5 is a perspective view showing the interior of a cooking pan according to a second embodiment, and FIG. 6 is a perspective view shown from a lower side of the cooking pan.

As shown in the drawings, the second embodiment is characterized by a structure in which the exhaust pipe 140, which is connected with the exhaust space part 130 formed on the lower surface of the bottom part 110 of the cooking pan 100 by the coupling of the distribution plate 120, is formed along an outer surface of the cooking pan in a radial direction.

In the second embodiment, the exhaust pipe 140 has a rectangular cross section, and is provided therein with a hollow space. The exhaust pipe 140 is configured so that an upper end 145 thereof is connected with a lateral exhaust hole 113 formed in one side of the cooking pan 100, and a lower end 146 thereof is connected with the exhaust space part 130. Thereby, the exhaust space part 130 can communicate with the interior of the cooking pan 100 via the exhaust pipe 140.

The exhaust pipe 140 is more preferably provided with a discharge hole 141 in its lower surface inserted into the exhaust space part 130. The discharge hole 141 is open so as to have the same center as the exhaust distributor 121 formed in the center of the upper surface of the distribution plate 120.

The second embodiment is also configured so that a pressure difference is generated between the interior and exterior of the cooking pan due to the flame of the gas stove which is applied below the distribution plate 120, and thus the smell and smoke generated from the interior of the cooking pan are forcibly discharged through the exhaust pipe 140 and are burnt and eliminated by the flame.

The present invention is more preferably configured so that, since the distribution plate 120 is coupled to the lower surface of the cooking pan 100 in a protruding shape, the lower surface of the bottom part of the cooking pan is provided with support legs 114 protruding beyond the distribution plate 120 so as to be able to be easily put in a horizontal direction, for instance, when stored.

Figure 7:
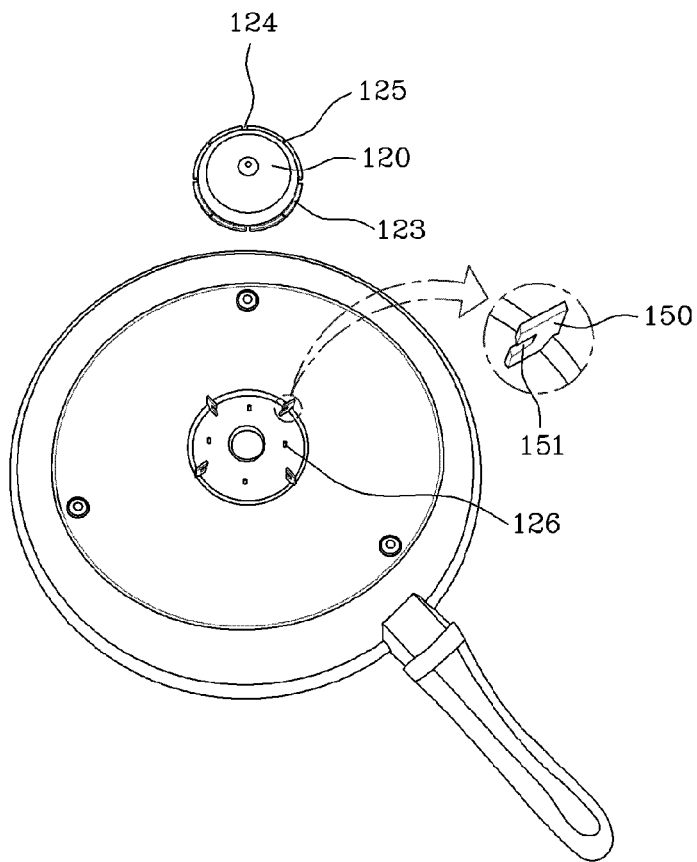
FIG. 7 is a schematic perspective view showing a cooking pan according to a third embodiment of the present invention.

Next, the cooking pan according to a third embodiment of the present invention will be described. FIG. 7 is a schematic perspective view showing a cooking pan according to a third embodiment.

As shown in the drawing, the cooking pan 100 of the third embodiment is basically configured so that the distribution plate 120 and the exhaust pipe 140 are formed so as to allow air to flow from the interior to the exterior of the cooking pan 100 via the exhaust space part 130, and is characterized in that the distribution plate 120 are configured to be detachably mounted using a plurality of couplers 150 formed on the lower surface of the bottom part 110 of the cooking pan, so that the distribution plate 120 can be easily separated, for instance, when cleaned.

In detail, as shown in FIG. 7, the plurality of couplers 150 are formed around the exhaust hole 111 formed in the center of the lower surface of the bottom part 110 of the cooking pan 100, and each coupler 150 is provided with a cut coupling slit 151. The distribution plate 120 is coupled using the coupling slits 151. To this end, the distribution plate 120 is provided with hooks 123 at an edge thereof which can be fitted into the coupling slits 151. Further, the edge of the distribution plate 120 is provided with notches 124 so as to separate the hooks 123 from each other and come in the same number as there are couplers 150. With this configuration, the couplers 150 are aligned with the notches 124 of the distribution plate 120, and then the distribution plate 120 is pushed in a vertical direction until the hooks 123 are flush with the coupling slits 151. Then, the distribution plate 120 is turned and constrained.

In this embodiment, since the number of couplers 150 is four, the number of hooks 123 formed on the distribution plate 120 is four, and the notches 124 number four and are formed at an angle of 90°. Each hook 123 is preferably provided with a protruding stopper 125 at an approximately middle point thereof. The stopper 125 determines a maximum rotational angle of the distribution plate 120.

More preferably, a plurality of support protrusions 126 are formed on the lower surface of the bottom part 110 of the cooking pan 100. As shown, the support protrusions 126 are located inside the couplers 150, and are designed so that the distribution plate 120 is installed in a more convenient manner when connected to the couplers 150. In detail, the support protrusions 126 have the same height as the coupling slits 151, and the distribution plate 120 is pushed with its notches 124 aligned with the couplers 150 until its upper surface comes into contact with the support protrusions 126, so that the hooks 123 of the distribution plate 120 are naturally flush with the coupling slits 151. Thus, only when the distribution plate 120 is turned, the constraint of the distribution plate 120 occurs.

When the distribution plate 120 can be selectively attached or detached in this way, it is very convenient to wash the cooking pan 100, and it is possible to reduce a danger of damage by detaching the distribution plate when the cooking pan is transported.

The cooking pan according to a fourth embodiment will be described.

The cooking pan employing the detachable distribution plate 120 can provide an advantage in that it can be used for another kind of cooking.

In detail, when food is cooked by gas flame with the distribution plate 120 separated from the cooking pan, the flame is drawn into the interior of the cooking pan through the exhaust pipe 140, and thus the interior of the cooking pan undergoes an increase in temperature. Thereby, the food can be cooked.

That is, this embodiment is applied to cooking that can performed as desired only when the bottom part and interior of the cooking pan are heated to a high temperature at the same time, so that it can be suitable to baking bread, pizza, sweet potato, potato, and so forth, and be effectively used to roast fish or meat in the open air where the smell or smoke is not an issue.

Thus, the cooking pan having the detachable distribution plate 120 can be used as a versatile cooking pan according to characteristics of the cooking and the environment of use due to easy attachment and detachment of the distribution plate 120. As a result, the cooking pan can be used to do the cooking with the distribution plate 120 coupled thereto as well as to do other types of cooking suitable for doing with the distribution plate 120 decoupled therefrom.

Figure 8:
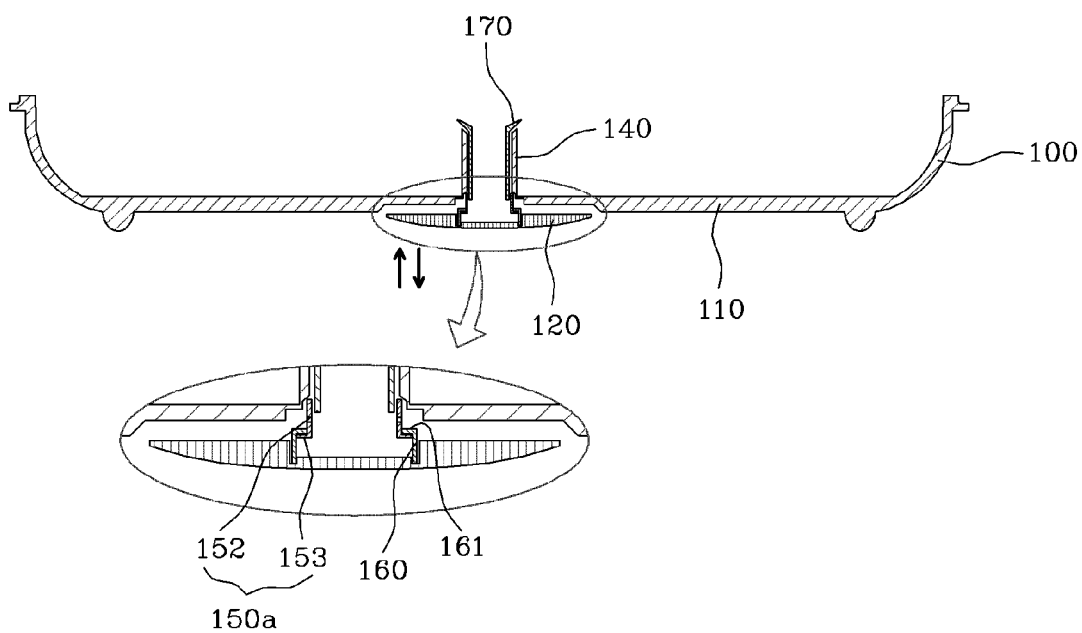
FIG. 8 is a schematic partial cross-sectional view showing a cooking pan according to a fifth embodiment of the present invention.
Figure 9:
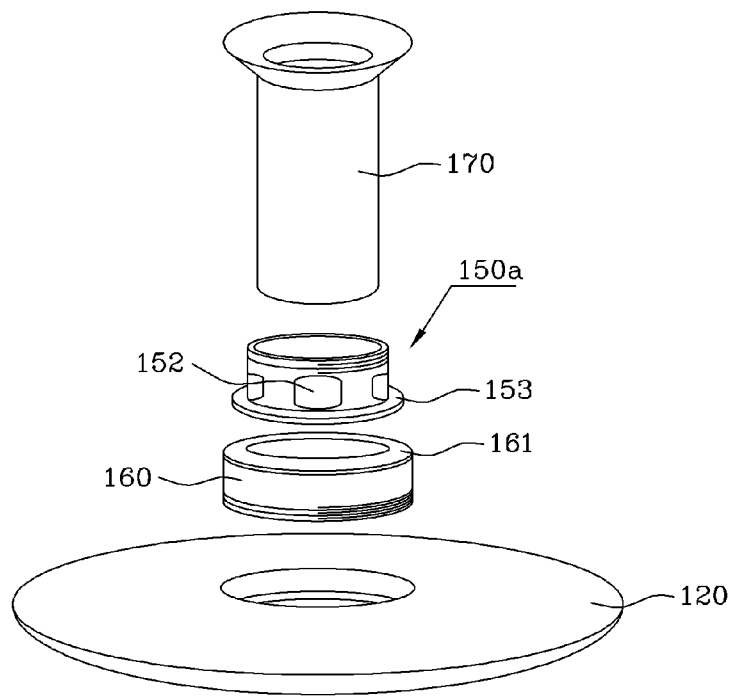
FIG. 9 is a disassembled perspective view showing the main components.
Figure 10:
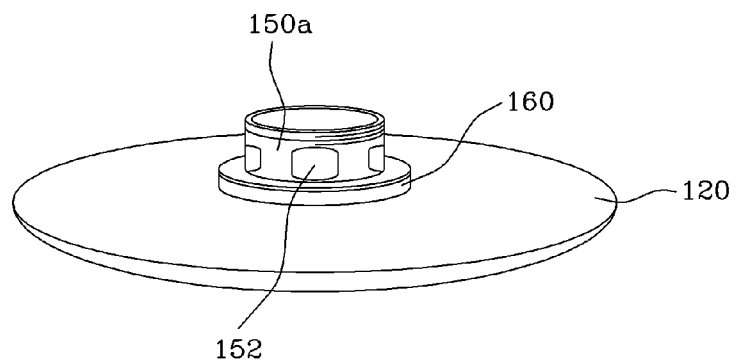
FIG. 10 is an assembled perspective view showing the main components.

Now, the cooking pan according to a fifth embodiment of the present invention will be described. FIG. 8 is a schematic partial cross-sectional view showing a cooking pan according to a fifth embodiment of the present invention. FIG. 9 is a disassembled perspective view showing the main components. FIG. 10 is an assembled perspective view showing the main components.

The cooking pan includes a lid (not shown), and thus is used with its lid closed when cooking is done. In this embodiment, the cooking pan also includes the exhaust pipe 140 and the distribution plate 120, and is configured so that the distribution plate 120 is allowed to move up and down.

More particularly, a closable coupler 150*a* is coupled to the lower surface of the bottom part 110 of the cooking pan 100, and communicates with the exhaust pipe 140. The distribution plate 120 is configured to move up and down along the closable coupler 150*a*.

As shown in the drawings, the closable coupler 150 communicating with the exhaust pipe 140 is coupled to the lower surface of the bottom part 110 of the cooking pan 100. The closable coupler 150 may have a cylindrical shape, and includes a plurality of outflow holes 152 in an outer circumferential surface thereof and a flange 153 at a lower end thereof. The closable coupler 150 may be coupled with the cooking pan 100 by various fixing methods including screwing.

To allow the distribution plate 120 to move up and down relative to the closable coupler 150*a*, a slide member 160 is provided. The slide member 160 is configured so that a lower end thereof is fastened to the upper surface of the distribution plate 120 and an upper end thereof is provided with a bent constraint end 161 so as to be able to be suspended on the flange 153. In this manner, when the constraint end 161 of the slide member 160 is configured to be suspended on the flange 153 of the closable coupler 150*a*, the slide member 160 and the distribution plate 120 coupled to the slide member 160 are allowed to move up and down along the closable coupler 150*a* within a predetermined range.

In this embodiment, when the cooking pan 100 is placed on the gas stove, the distribution plate 120 is lowered along the closable coupler 150*a* due to a dead load, and thus the outflow holes 152 formed in the outer circumferential surface of the closable coupler 150*a* are in an open state. The smell and smoke generated from the interior of the cooking pan 100 are discharged from the exhaust pipe 140 to the exhaust space part 130 via the outflow holes 152, and are eliminated by the flame.

Figure 11:
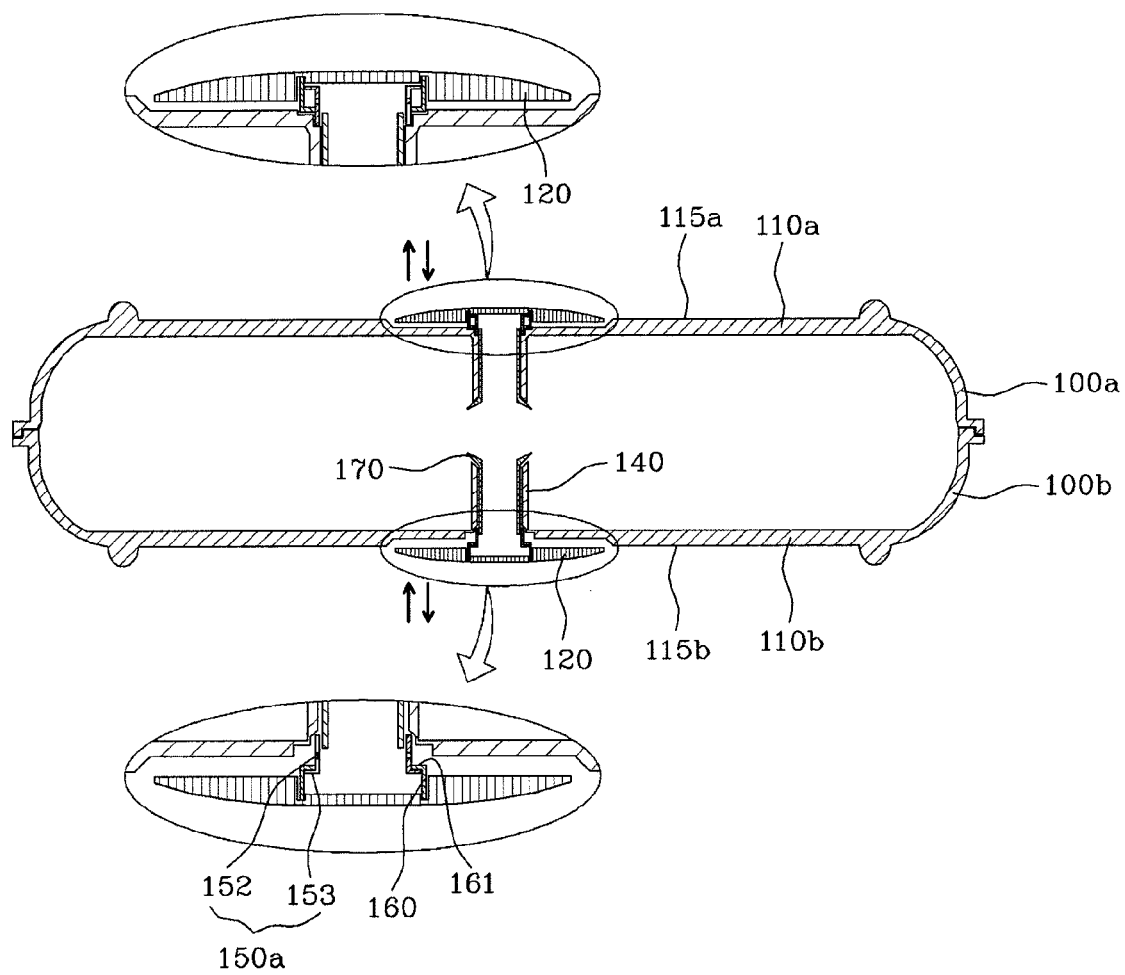
FIG. 11 is a schematic cross-sectional view showing a cooking pan according to a sixth embodiment of the present invention.

Next, a sixth embodiment of the present invention will be described. FIG. 11 is a schematic cross-sectional view showing a cooking pan according to a sixth embodiment.

This embodiment relates to a double-sided cooking pan capable of using both sides to do cooking. An upper cooking pan 100*a* and a lower cooking pan 100*b* are paired without a separate lid, and are allowed to be turned upside down when the cooking is done.

As shown in the drawing, the upper cooking pan 100*a* and the lower cooking pan 100*b* are made up of the same components, particularly the distribution plate 120, the exhaust pipe 140, the closable coupler 150*a*, and the slide member 160.

As in the other embodiments, the distribution plate 120 is installed in the center of the outer surface 115*a* of the bottom part 110*a* of the upper cooking pan and the outer surface 115*b* of the bottom part 110*b* of the lower cooking pan with a predetermined gap, thereby forming the exhaust space part 130. The exhaust pipe 140 is installed in the interior of the cooking pan, and is connected with the exhaust space part 130.

The distribution plate 120 is configured to be movable in upward and downward directions. For this purpose, the closable coupler 150*a* and the slide member 160 are used. The closable coupler 150*a* is coupled to the outer surface 115*a* of the bottom part 110*a* of the upper cooking pan 100*a* or the outer surface 115*b* of the bottom part 110*b* of the lower cooking pan 100*b* so as to communicate with the exhaust pipe 140, and is provided with a plurality of outflow holes 152 in an outer circumferential surface thereof and a flange 153 at a lower end thereof. The slide member 160 is coupled with the distribution plate 120, and is provided with a bent constraint end 161 at an upper end thereof so as to be constrained to the flange 153 of the closable coupler 150*a*. Accordingly, the distribution plate 120 and the slide member 160 are allowed to move up and down.

As shown, the distribution plate 120 installed on the upper cooking pan 100*a* is lowered due to a dead load to block the outflow holes 152 of the closable coupler 150*a*, while the distribution plate 120 installed on the lower cooking pan 100*b* is lowered to open the outflow holes 152 of the closable coupler 150*a*.

The cooking pan of the present embodiment allows the cooking to be done using opposite sides of the cooking pan. Thus, when the cooking pan is turned upside down, a phenomenon opposite the foregoing operation occurs.

Meanwhile, in all the embodiments, a detachable washing pipe 170 may be installed on the exhaust pipe 140. That is, as shown in FIGS. 1, 8 and 9, the washing pipe 170 is a hollow pipe that is inserted into the exhaust pipe 140. Preferably, an upper end of the washing pipe 170 is flared in a funnel shape so that the smell or smoke can be smoothly discharged.

When the washing pipe 170 is provided, a variety of foreign materials oil ingredients that may be deposited on an inner surface of the exhaust pipe 140 can be easily removed, and the washing pipe 170 can be separated and washed easily. Thus, the problems such as offensive smell or the growth of mold caused by contamination of the exhaust pipe 140 can be effectively overcome.

Although the embodiments of the present invention have taken a circular cooking pan by way of example, the cooking pan may vary so as to have various shapes such as a quadrilateral shape in addition to the circular shape. The cooking pan may also vary so as to have various depths such as a shallower or deeper depth.

INDUSTRIAL APPLICABILITY

As described above, the cooking pan having the exhaust device can remarkably reduce smells or smoke generated when cooking, and the emission of carbon dioxide. As such, the present invention is a promising technology that is expected to be widely applied instead of existing cooking vessels.

The invention claimed is:

1. A cooking pan provided with an exhaust device comprising:
    an exhaust hole formed at a center of a bottom part of the cooking pan;
    a distribution plate having a diameter larger than a diameter of the exhaust hole, the distribution plate installed at a center of a lower surface of the bottom part of the cooking pan with a predetermined gap to form an exhaust space part between the distribution plate and the lower surface of the bottom part of the cooking pan; and
    an exhaust pipe protruding from an upper surface of the bottom part, the exhaust pipe connecting the exhaust space part with an interior of the cooking pan,
    wherein:
    odors or smoke generated in the interior of the cooking pan are discharged via the exhaust hole and the exhaust space part when food is cooked,
    the exhaust pipe is installed on the upper surface of the bottom part so as to be connected with the exhaust hole in the center of the bottom part,
    the distribution plate is selectively attached to and detached from a plurality of couplers formed on the lower surface of the bottom part of the cooking pan, and each coupler includes a cut coupling slit,
    the distribution plate includes hooks at an edge thereof which are fitted into the coupling slits, and
    the edge of the distribution plate includes notches so as to separate the hooks from each other and come in the same number as there are couplers.

2. The cooking pan according to claim 1, wherein the distribution plate includes an exhaust distributor protruding from the center of an upper surface of the distribution plate in a conical shape, and a flame distributor formed on a lower surface of the distribution plate in a dome shape.

3. The cooking pan according to claim 2, wherein the distribution plate is formed of ceramic.

4. The cooking pan according to claim 1, wherein the distribution plate is coupled to the bottom part of the cooking pan so as to form the exhaust space part using a plurality of protrusion nuts formed on the bottom part of the cooking pan and bolts.

5. The cooking pan according to claim 1, wherein each hook includes a protruding stopper that restricts a maximum rotational angle of the distribution plate.

6. The cooking pan according to claim 5, wherein the lower surface of the bottom part of the cooking pan has a plurality of support protrusions, and each support protrusion has a same height as the coupling slit so as to easily fasten the distribution plate.

7. A cooking pan provided with an exhaust device comprising:
    an exhaust hole formed at a center of a bottom part of the cooking pan;
    a distribution plate having a diameter larger than a diameter of the exhaust hole, the distribution plate installed at a center of a lower surface of the bottom part of the cooking pan with a predetermined gap to form an exhaust space part between the distribution plate and the lower surface of the bottom part of the cooking pan; and
    an exhaust pipe protruding from an upper surface of the bottom part, the exhaust pipe connecting the exhaust space part with an interior of the cooking pan,
    wherein:
    odors or smoke generated in the interior of the cooking pan are discharged via the exhaust hole and the exhaust space part when food is cooked,
    the distribution plate is provided with a closable coupler that is coupled to the bottom part of the cooking pan so as to communicate with the exhaust pipe and a slide member that is coupled with the distribution plate at a lower end,
    the closable coupler includes a plurality of outflow holes formed in an outer circumferential surface and a protruding flange at a lower end, and
    the slide member includes a constraint end suspended on the protruding flange at an upper end of the slide member, so as to allow the distribution plate to move up and down.

8. A cooking pan comprising:
    an upper cooking pan and a lower cooking pan;
    distribution plates, each of which is installed at the center of an outer surface of a bottom part of each of the upper and lower cooking pans with a predetermined gap to form an exhaust space part;
    exhaust pipes, each of which connects the exhaust space part with an interior of the cooking pan;
    closable couplers, each closable coupler coupled to the bottom part of each of the upper and lower cooking pans so as to communicate with the exhaust pipe, and including a plurality of outflow holes formed in an outer circumferential surface and a protruding flange at a lower end; and
    slide members, each slide member coupled with the distribution plate at a lower end and including a constraint end suspended on the protruding flange at an upper end of the slide member, so as to allow the distribution plate to move up and down.

9. The cooking pan according to claim 1, wherein the exhaust pipe includes a detachable washing pipe.

10. The cooking pan according to claim 8, wherein the exhaust pipe includes a detachable washing pipe.

11. The cooking pan according to claim 1, wherein the exhaust pipe extends along the upper surface of the bottom part and radially outwardly from the exhaust hole.

12. The cooking pan according to claim 8, wherein the upper cooking pan and the lower cooking pan face each other and come into contact with each other.

13. A cooking pan provided with an exhaust device comprising:
    a lateral exhaust hole formed in one side of the cooking pan;
    a distribution plate installed at a center of a lower surface of a bottom part of the cooking pan with a predetermined gap to form an exhaust space part between the distribution plate and the lower surface of the bottom part of the cooking pan; and
    an exhaust pipe formed along an outer surface of the cooking pan, the exhaust pipe configured so that an upper end of the exhaust pipe is connected with the lateral exhaust hole and a lower end of the exhaust pipe leads to the exhaust space part,
    wherein:
    the distribution plate is selectively attached to and detached from a plurality of couplers formed on the lower surface of the bottom part of the cooking pan, and each coupler includes a cut coupling slit, the distribution plate includes hooks at an edge thereof which are fitted into the coupling slits, and the edge of the distribution plate includes notches so as to separate the hooks from each other and come in the same number as there are couplers, each hook includes a protruding stopper that restricts a maximum rotational angle of the distribution plate, the exhaust pipe includes a discharge hole in a lower surface of the lower end of the exhaust pipe, the lower end of the exhaust pipe being in the exhaust space part, the discharge hole is concentric with an upper surface of the distribution plate, the distribution plate has a diameter larger than a diameter of the discharge hole, and odors or smoke generated in the interior of the cooking pan are discharged via the exhaust hole and the exhaust space part when food is cooked.

* * * * *